(12) United States Patent
Lagudu et al.

(10) Patent No.: US 11,995,149 B2
(45) Date of Patent: May 28, 2024

(54) SPARSE MATRIX-VECTOR MULTIPLICATION

(71) Applicant: ADVANCED MICRO DEVICES, INC., Santa Clara, CA (US)

(72) Inventors: Sateesh Lagudu, Hyderabad (IN);
Allen H. Rush, Santa Clara, CA (US);
Michael Mantor, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 832 days.

(21) Appl. No.: 17/125,457

(22) Filed: Dec. 17, 2020

(65) Prior Publication Data
US 2022/0197973 A1 Jun. 23, 2022

(51) Int. Cl.
*G06F 17/16* (2006.01)
*G06F 9/30* (2018.01)
*G06F 15/80* (2006.01)

(52) U.S. Cl.
CPC .......... *G06F 17/16* (2013.01); *G06F 9/30098* (2013.01); *G06F 15/80* (2013.01)

(58) Field of Classification Search
CPC .. G06F 117/16; G06F 9/30098; G06F 9/3001; G06F 9/30036

USPC ......................................................... 708/520
See application file for complete search history.

(56) References Cited

U.S. PATENT DOCUMENTS

2019/0386717 A1* 12/2019 Shattil ................. H04L 27/2614

OTHER PUBLICATIONS

Yongchao Liu et al., "Faster Compressed Sparse Row (CSR)-based Sparse Matrix-Vector Multiplication using CUDA", Johannes Gutenberg Universitat, GPU Technology Conference, Jan. 2015, 1 pg.

* cited by examiner

*Primary Examiner* — Tan V Mai

(57) ABSTRACT

A processing system includes a first set and a second set of general-purpose registers (GPRs) and memory access circuitry that fetches nonzero values of a sparse matrix into consecutive slots in the first set. The memory access circuitry also fetches values of an expanded matrix into consecutive slots in the second set of GPRs. The expanded matrix is formed based on values of a vector and locations of the nonzero values in the sparse matrix. The processing system also includes a set of multipliers that concurrently perform multiplication of the nonzero values in slots of the first set of GPRs with the values of the vector in corresponding slots of the second set. Reduced sum circuitry accumulates results from the set of multipliers for rows of the sparse matrix.

20 Claims, 12 Drawing Sheets

SPARSE MATRIX-VECTOR MULTIPLICATION

BACKGROUND

Graphics processing units (GPUs) and other multi-threaded processing units typically implement multiple processing elements (which are also referred to as processor cores or compute units) that concurrently execute multiple instances of a single program on multiple data sets. For example, the processing elements can implement single-instruction-multiple-data (SIMD) protocols to concurrently execute the same instruction on multiple data sets using multiple processor cores. Operations that are well-suited to implementation on multithreaded processing units include matrix operations such as multiplication of a matrix and a vector. Matrix-matrix multiplications of a first matrix and a second matrix can be decomposed into a set matrix-vector multiplications of the first matrix and respective columns of the second matrix. Matrix-vector multiplication is used in many applications including machine learning and artificial intelligence applications. However, the matrices in these applications are typically sparse, i.e., most of the entries in the matrices have a value of zero.

Storing a large sparse matrix can unnecessarily consume a significant amount of memory because most of the entries are zero. Sparse matrices are therefore compressed to conserve space in memory. A compressed sparse row (CSR) format represents a sparse matrix by three one-dimensional arrays: (1) a first array of entries that indicate the nonzero values of the sparse matrix, (2) a second array of entries that indicate the column indices of the nonzero values in the sparse matrix, and (3) a third array of entries that indicate the number of nonzero values in each row of the sparse matrix. Alternatively, a compressed sparse column (CSC) format uses three arrays to represent the nonzero values, the row indices, and the number of nonzero entries in each column of the sparse matrix. Other techniques can also be used to compress sparse matrices in other contexts or based on properties of the sparse matrices.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
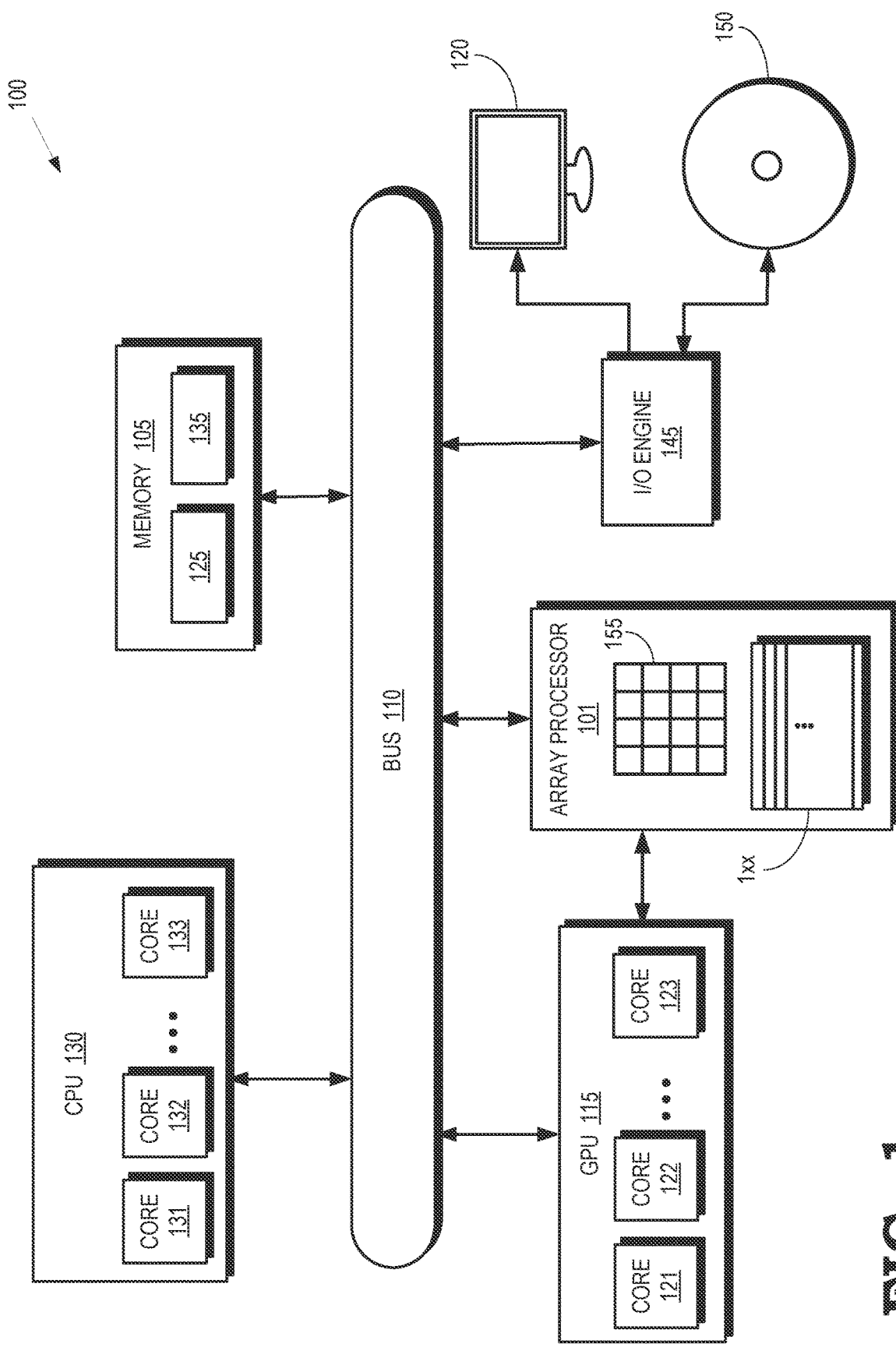
FIG. 1 is a block diagram of a processing system that performs matrix-vector multiplication on sparse matrices using an array processor according to some embodiments.

Compressed sparse matrices are used to reduce the bandwidth and computation requirements of matrix operations performed in processing units such as GPUs. Brute force computation of a matrix-vector multiplication of a sparse matrix with a (dense) vector unnecessarily consumes a significant amount of bandwidth to retrieve zero values of the sparse matrix from memory and computational power to compute trivial "multiplication by zero" operations. The bandwidth and computational power consumption of the matrix-vector multiplication are reduced by using the information in the compressed representation of the sparse matrix to identify elements in the vector that are to be multiplied with the nonzero values of the sparse matrix. For example, the row and column indices of the nonzero values of the sparse matrix can be used to generate an expanded matrix that has columns including the values of the vector that are multiplied by the values in corresponding rows of the sparse matrix. The result of the matrix-vector multiplication is generated by multiplying values in each row of the compressed representation with corresponding values in each column of the expanded matrix. The results are accumulated for each row the compressed representation to compute values of an output vector that represents the product of the sparse matrix and the input vector.

In operation, the processor stores information retrieved from the memory in general-purpose registers (GPRs). Conventional sparse matrix-vector multiplication does not efficiently use the GPRs that hold the compressed representation of the sparse matrix and the expanded matrix generated from the vector that has been retrieved from the memory. For example, the values in each row of the compressed representation are stored in a different GPR. The number of values in each row is typically significantly less than the number of slots available in the allocated GPR because of the sparsity of the full matrix. Thus, most of the slots in the GPRs are empty. Similarly, the values in each column of the expanded matrix are stored in different GPRs and most of the entries in these GPRs are empty. Furthermore, an additional set of registers is required to store mask vectors that identify the valid (e.g., nonzero) slots in the registers that store the values of the sparse matrix and the expanded matrix. Conventional sparse matrix-vector multiplication also leads to different latencies for the accumulators used to accumulate the products of multiplications of values in the sparse matrix and expanded matrix for each row-column pair. The maximum latency is therefore determined by the row-column pair having the largest number of nonzero entries.

FIGS. 1-12 disclose embodiments of processor units, and techniques thereof, that reduce the number of registers consumed by a sparse matrix-vector multiplication, while also reducing the latency of the accumulation process used by the sparse matrix-vector multiplication, by fetching nonzero values of the sparse matrix into consecutive slots in a first set of general-purpose registers (GPRs). All slots of a GPR in the first set are filled with a nonzero value of the sparse matrix before subsequent nonzero values are fetched into the next GPR. Thus, the GPRs in the first set are packed with nonzero values so that none of the slots of the GPR are left empty while there are additional nonzero values of the sparse matrix remaining to be fetched. The values of the expanded matrix generated based on the vector are also fetched into consecutive slots in a second set of GPRs. The value in each slot of the second set of GPRs will be multiplied by the value in the corresponding slot of the first set of GPRs. To perform the sparse matrix-vector multiplication, the nonzero values in the slots of the first set of GPRs are multiplied by the values in the corresponding slots of the second set of GPRs. In some embodiments, the number of multipliers (e.g., arithmetic logic units, ALUs) is equal to the number of slots in a GPR. Thus, the multipliers concurrently perform multiplication of the nonzero values in the slots of a GPR in the first set with the values in the slots of a corresponding GPR in the second set, regardless of which row or column is associated with the values in slots of the GPR. Results of the multiplications are stored in a shared memory such as a local data store (LDS). A reduced sum operation accumulates the results associated with the rows of the sparse matrix to determine values of the entries in an output vector that represents the product of the sparse matrix and the input vector.

FIG. 1 is a block diagram of a processing system 100 that performs matrix-vector multiplication on sparse matrices using an array processor 101 according to some embodiments. The processing system 100 includes or has access to a memory 105 or other storage component that is implemented using a non-transitory computer-readable medium such as a dynamic random-access memory (DRAM). However, in some cases, the memory 105 is implemented using other types of memory including static random-access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). FIG. 1 illustrates an example of a parallel processor, and in particular a graphics processing unit (GPU) 115, in accordance with some embodiments. The GPU 115 renders images for presentation on a display 120. For example, the GPU 115 renders objects to produce values of pixels that are provided to the display 120, which uses the pixel values to display an image that represents the rendered objects. The GPU 115 implements a plurality of processor cores 121, 122, 123 (collectively referred to herein as "the processor cores 121-123") that execute instructions concurrently or in parallel. Some embodiments of the processor cores 121-123 operate as SIMD units that perform the same operation on different data sets. The number of processor cores 121-123 implemented in the GPU 115 is a matter of design choice and some embodiments of the GPU 115 include more or fewer processor cores than shown in FIG. 1. Some embodiments of the GPU 115 are used for general-purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that execute instructions concurrently or in parallel. Some embodiments of the processor cores 131-133 operate as SIMD units that perform the same operation on different data sets. The number of processor cores 131-133 implemented in the CPU 130 is a matter of design choice and some embodiments include more or fewer processor cores than illustrated in FIG. 1. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some embodiments of the CPU 130 implement multiple processor cores (not shown in FIG. 1 in the interest of clarity) that execute instructions concurrently or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the GPU 115, or the CPU 130. In the illustrated embodiment, the I/O engine 145 reads information stored on an external storage component 150, which is implemented using a non-transitory computer-readable medium such as a compact disk (CD), a digital video disc (DVD), and the like. The I/O engine 145 is also able to write information to the external storage component 150, such as the results of processing by the GPU 115 or the CPU 130.

The array processor 101 supplements the processing power of the GPU 115 and, in some embodiments, the CPU 130. A set 155 of processor element arrays (PEAs) are used to perform operations that accelerate or improve the performance of the GPU 115 by allowing the GPU 115 to offload kernel operations or other tasks to one or more of the PEAs in the set 155. The PEAs are also referred to as signal processors in some cases. The PEAs return results to the GPU 115. In some embodiments, the PEAs are implemented as vector arithmetic logic units (ALUs) that include circuitry to perform arithmetic and bitwise operations on integer binary numbers. The PEAs therefore receive one or more inputs (or operands) and generate corresponding outputs based on the operands and an opcode that indicates the operation that is performed by the processor element array. The operands, opcodes, and other status values are stored in registers 160 associated with the PEAs. In some embodiments, the registers 160 are implemented as general-purpose registers (GPRs) such as vector GPRs (VGPRs). Although the registers 160 are shown in the array processor 101, other sets of registers are implemented in other locations within the processing system 100 such as registers implemented in the GPU 115 or the CPU 130.

As discussed herein, some embodiments of the array processor 101 perform matrix operations such as multiplication of a matrix and a vector. The matrices in many applications implemented in the processing system 100 are sparse, i.e., most of the entries in the matrices have a value of zero. The sparse matrices are therefore compressed to conserve space in memory 105. Some embodiments of the processing system 100 represent sparse matrices in a compressed sparse row (CSR) format that represents a sparse matrix by three one-dimensional arrays: (1) a first array of entries that indicate the nonzero values of the sparse matrix, (2) a second array of entries that indicate the column indices of the nonzero values in the sparse matrix, and (3) a third array of entries that indicate the number of nonzero values in each row of the sparse matrix. During a matrix-vector multiplication involving the sparse matrix, the information in the compressed representation of the sparse matrix is used to identify elements in the vector that are to be multiplied with the nonzero values of the sparse matrix. The array processor 101 then multiplies values in each row of the compressed representation with corresponding values in each column of the expanded matrix. The results are accumulated for each row the compressed representation to compute values of an output vector that represents the product of the sparse matrix and the input vector.

The array processor 101 includes memory access circuitry that fetches nonzero values of the sparse matrix into consecutive slots in the registers 160. In some embodiments, the memory access circuitry includes a direct memory access (DMA) engine, a texture address (TA) engine, a texture data (TD) engine, and other circuitry. The memory access circuitry also fetches values of the expanded matrix into consecutive slots in the registers 160. As disclosed herein, the memory access circuitry fetches the nonzero values of the sparse matrix (and the values of the expanded matrix including the vector values) all the slots of one GPR in the registers 160 before fetching subsequent nonzero values into another GPR in the registers 160. Consecutive slots in the GPR are not left empty while there are additional nonzero values of the sparse matrix remaining to be fetched. Thus, each GPR is completely filled with nonzero values before the memory access circuitry begins filling another GPR in the registers 160.

The array processor 101 also includes a set of multipliers (not shown in FIG. 1 the interest of clarity) that concurrently perform multiplication of the nonzero values in slots of the registers 160 with the values of the vector in corresponding slots of other registers 160 that are used to store the vector values. Reduced sum circuitry (not shown in FIG. 1 in the interest of clarity) accumulates results from the set of multipliers for rows of the sparse matrix.

Figure 2:
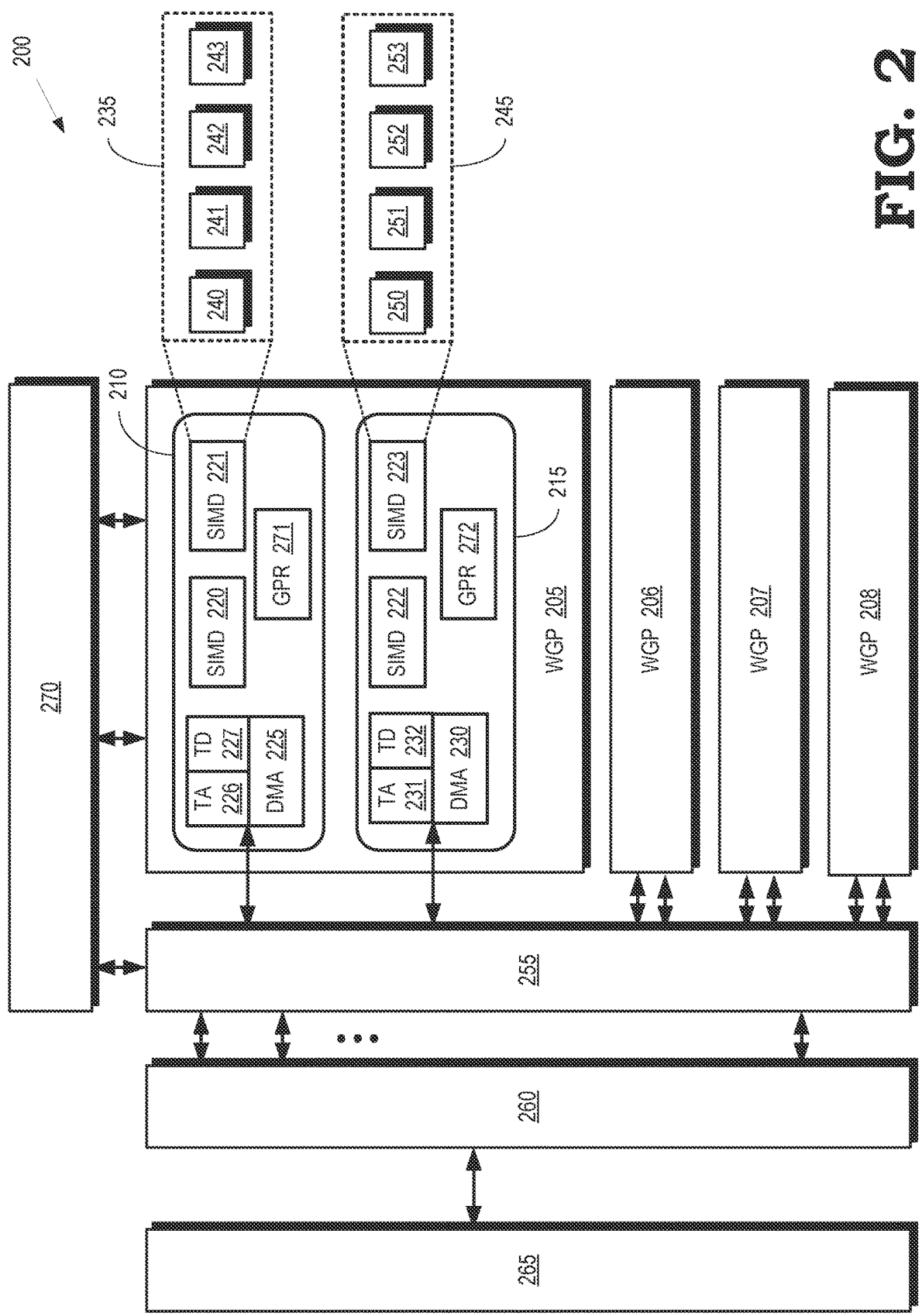
FIG. 2 is a block diagram of a portion of a processing system that performs matrix-vector multiplication on a compressed version of a sparse matrix according to some embodiments.

FIG. 2 is a block diagram of a portion of a processing system 200 that matrix-vector multiplication on a compressed version of a sparse matrix according to some embodiments. The processing system 200 is used to implement some embodiments of the array processor 101 shown in FIG. 1. The processing system 200 includes a set of WGPs 205, 206, 207, 208 (collectively referred to herein as "the WGPs 205-208") that implement pairs of compute units 210, 215. The compute units 210, 215 are only illustrated in the WGP 205 in the interest of clarity, although the WGPs 206-208 also include pairs of compute units. Some embodiments of the processing system 200 implement more or fewer WGP and corresponding compute units.

The WGPs 205-208 include SIMD units 220, 221, 222, 223 (collectively referred to herein as "the SIMD units 220-223") and memory access circuitry such as direct memory access (DMA) engines 225, 230. The memory access circuitry also includes TA engines 226, 231 and TD engines 227, 232 that operate in conjunction with the DMA engines 225, 230 and sequencers (not shown in FIG. 2 in the interest of clarity), as discussed herein. Each of the SIMD units 220-223 implements a portion of a set of PEAs. In the illustrated embodiment, the SIMD unit 221 includes a subset 235 of PEAs 240, 241, 242, 243 (collectively referred to herein as "the PEAs 240-243") and the SIMD unit 223 includes a subset 245 of PEAs 250, 251, 252, 253 (collectively referred to herein as "the PEAs 250-253"). The SIMD units 220, 222 also include other subsets of PEAs that are not shown in FIG. 2 in the interest of clarity. The PEAs 240-243, 250-253 are sometimes referred to as "PEAs 240-243, 250-253."

The DMA engines 225, 230 are connected to a memory fabric 255 that provides one or more channels between the DMA engines 225, 230 and an SRAM 260. In the illustrated embodiment, the SRAM 260 is connected to a system memory 265 such as the memory 105 shown in FIG. 1. In some embodiments, the memory fabric 255 is part of the memory access circuitry. As discussed herein, values of entries in the sparse matrix and the vector (e.g., the enhanced matrix derived from the vector) are fetched into corresponding registers 271, 272 via the memory fabric 255. The processing system 200 also includes an asynchronous compute engine 270 that communicates with the WGPs 205-208 and the memory fabric 255.

Figure 3:
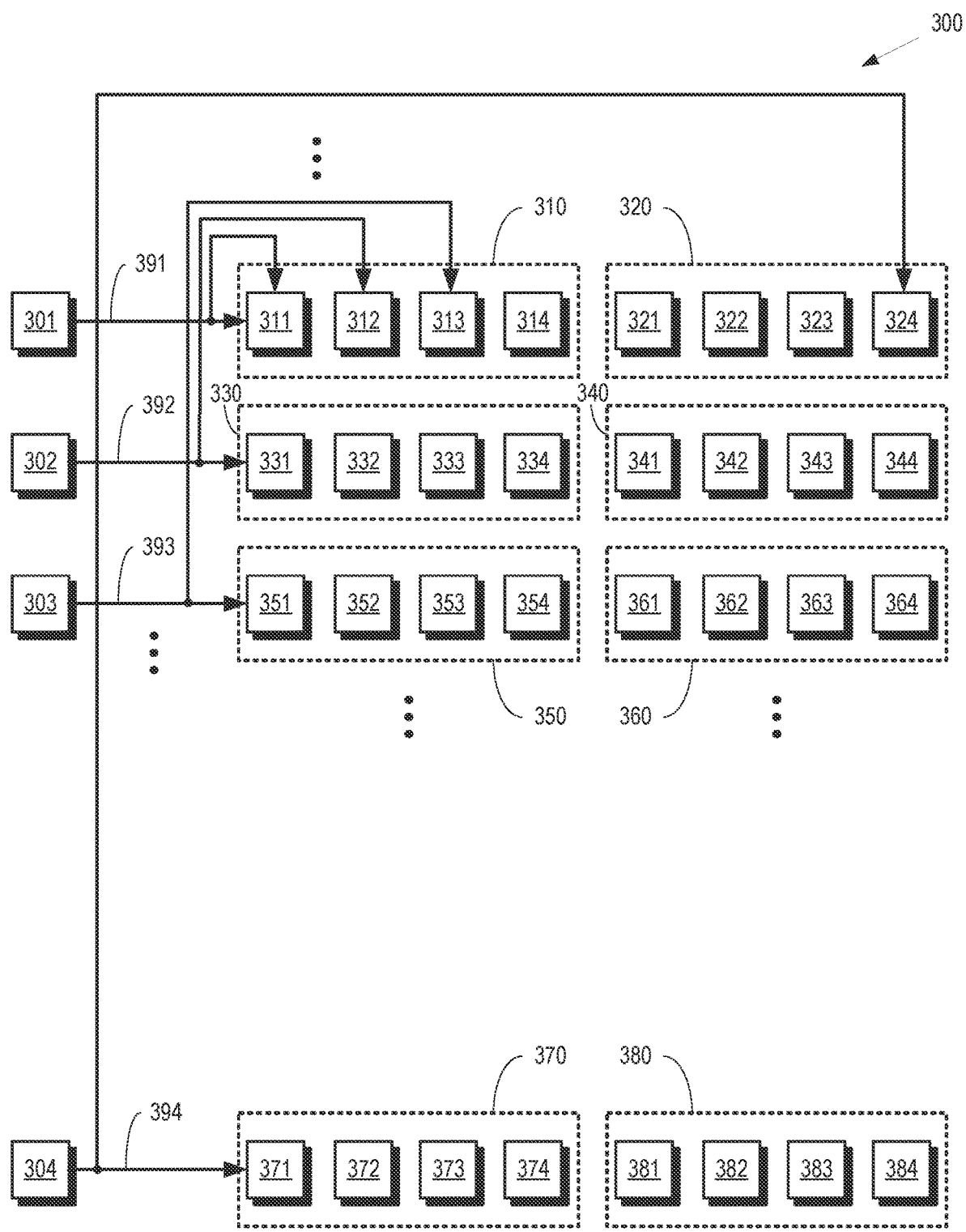
FIG. 3 is a block diagram of an array processor that implements dynamically adaptable arrays to perform matrix-vector multiplications on sparse matrices according to some embodiments.

FIG. 3 is a block diagram of an array processor 300 that implements dynamically adaptable arrays to perform matrix-vector multiplications on sparse matrices according to some embodiments. The array processor 300 is used to implement some embodiments of the array processor 101 shown in FIG. 1. The array processor 300 includes DMA engines 301, 302, 303, 304 (collectively referred to herein as "the DMA engines 301-304") that fetch parameters from a memory such as the memory 105 shown in FIG. 1 or the memories 260, 265 shown in FIG. 2. The array processor 300 also includes SIMD units 310, 320, 330, 340, 350, 360, 370, 380 that are implemented using corresponding subsets of PEAs 311, 312, 313, 314, 321, 322, 323, 324, 331, 332, 333, 334, 341, 342, 343, 344, 351, 352, 353, 354, 361, 362, 363, 364, 371, 372, 373, 374, 381, 382, 383, and 384 (collectively referred to herein as "the PEAs 311-384" for the sake of brevity; the hyphen is therefore not intended to indicate a continuous sequence of numerals between 311 and 384). Some embodiments of the SIMD units 310, 320, 330, 340, 350, 360, 370, 380 are implemented in different WGPs. For example, a first WGP can implement the SIMD unit 310, 320, a second WGP can implement the SIMD units 330, 340, a third WGP can implement the SIMD units 350, 360, and a fourth WGP can implement the SIMD units 370, 380.

The DMA engines 301-304 are interconnected with mutually exclusive subsets of the PEAs 311-384. In the illustrated embodiment, the DMA engines 301-304 are interconnected to mutually exclusive rows and columns in the array of PEAs 311-384 using physical connections 391-394 that include wires, traces, and the like. The DMA engine 301 is connected to a row including the PEAs 311-314, 321-324 and a column including the PEAs 311, 331, 351, 371 by a physical connection 391. The DMA engine 301 can therefore broadcast parameter values fetched from the memory to the PEAs 311-314, 321-324, the PEAs 311, 331, 351, 371, subsets of these PEAs, or a combination thereof. The DMA engine 302 is connected to a row including the PEAs 331-334, 341-344 and a column including the PEAs 312, 332, 352, 372 by a physical connection 392. The DMA engine 302 can therefore broadcast parameter values fetched from the memory to the PEAs 331-334, 341-344, the PEAs 312, 332, 352, 372, subsets of these PEAs, or a combination thereof. The DMA engine 303 is connected to a row including the PEAs 351-354, 361-364 and a column including the PEAs 313, 333, 353, 373 by a physical connection 393. The DMA engine 303 can therefore broadcast parameter values fetched from the memory to the PEAs 351-354, 361-364, the PEAs 313, 333, 353, 373, subsets of these PEAs, or a combination thereof. The DMA engine 304 is connected to a row including the PEAs 371-374, 381-384 and a column including the PEAs 324, 344, 364, 384 by a physical connection 394. The DMA engine 304 can therefore broadcast parameter values fetched from the memory to the PEAs 371-374, 381-384, the PEAs 324, 344, 364, 384, subsets of these PEAs, or a combination thereof.

Figure 4:
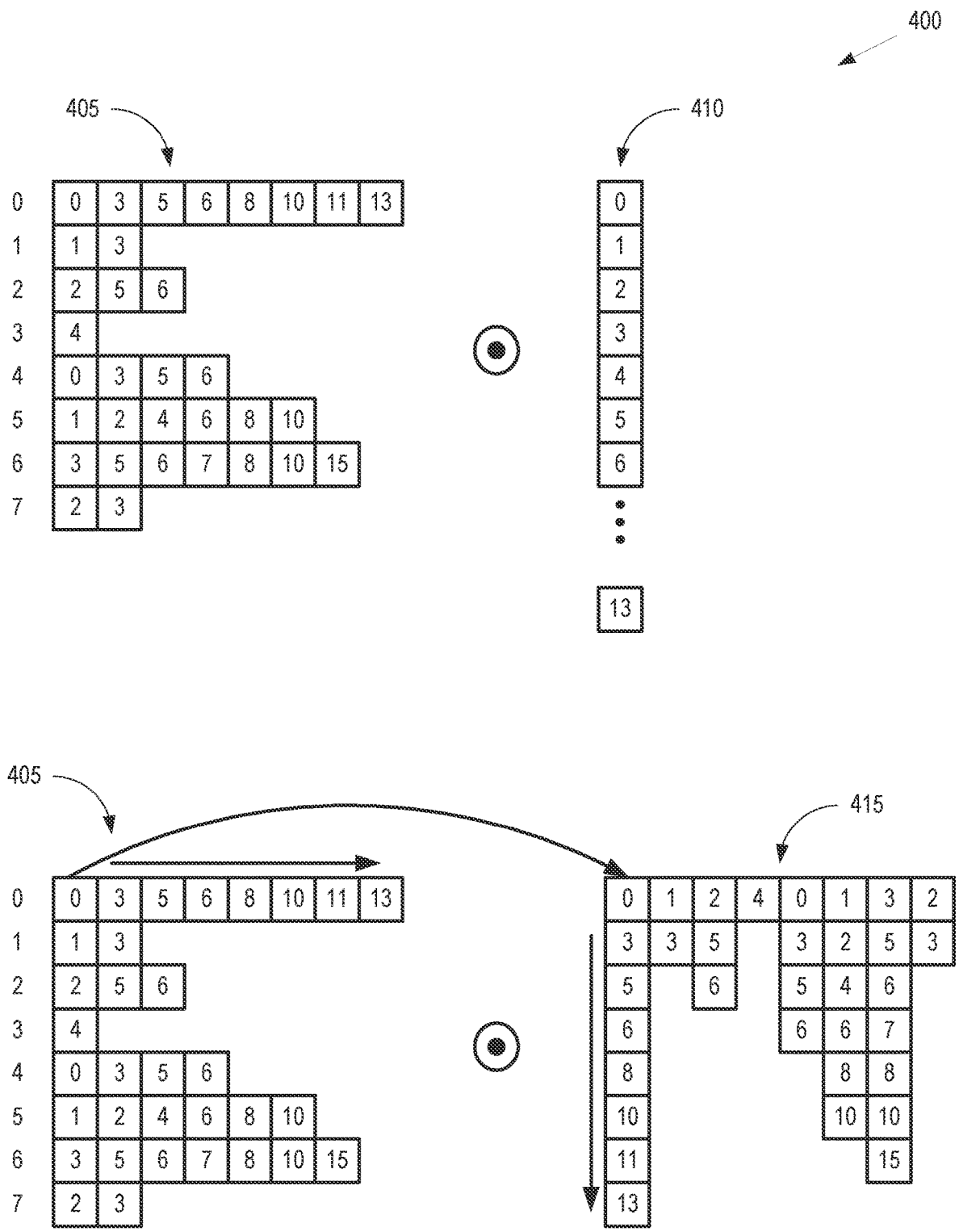
FIG. 4 is a block diagram of matrix-vector multiplication that is performed on the sparse matrix and a vector according to some embodiments.

FIG. 4 is a block diagram of matrix-vector multiplication 400 that is performed on the sparse matrix 405 and a vector 410 according to some embodiments. The matrix-vector multiplication 400 is performed by some embodiments of the array processor 101 shown in FIG. 1, the processing system processing system 200 shown in FIG. 2, and the array processor 300 shown in FIG. 3.

In the illustrated embodiment, the sparse matrix 405 is represented using a compressed format that stores the nonzero values at locations indicated by the row and column index of the location of the nonzero value in the sparse matrix 405. For example, the top row of boxes corresponds to row 0 of the sparse matrix 405 (as indicated by the to the left of the row). Each box in the row includes a nonzero value of the sparse matrix from the column indicated by the number in the box. For example, the representation of the sparse matrix 405 includes the values at column 0, column 3, column 5, column 6, column 8, column 10, column 11, and column 13 of row 0. For another example, the representation of the sparse matrix 405 includes the values at column 2 and column 3 of row 7 in the sparse matrix 405. The vector 410 is represented in an uncompressed format, e.g., as a set of values of a single column matrix. In the illustrated embodiment, the vector 410 includes fourteen values indicated by the indices 0..13 in the boxes of the vector 410.

An expanded matrix 415 is generated based on the vector 410 and the sparse matrix 405. The expanded matrix 415 includes a set of columns that correspond to the rows of the sparse matrix 405. In the illustrated embodiment, the expanded matrix 415 includes eight columns corresponding to the eight rows [0..7] of the sparse matrix 405. Each column of the expanded matrix 415 includes values of the vector 410 that are multiplied by corresponding values of the sparse matrix 405, as indicated by the row/column indices in the sparse matrix 405 and the corresponding row indices in the vector 410. For example, the first column of the expanded matrix 415 includes values of the vector 410 at the locations indicated by the row indices 0, 3, 5, 6, 8, 10, 11, and 13 because these are the indices of the columns that include the nonzero values of the sparse matrix 405 in the row 0. For another example, the last (eighth) column of the expanded matrix 415 includes values of the vector 410 at the locations indicated by the row indices 2 and 3 because these are the indices of the columns that include the nonzero values of the sparse matrix 405 in the row 7.

Figure 5:
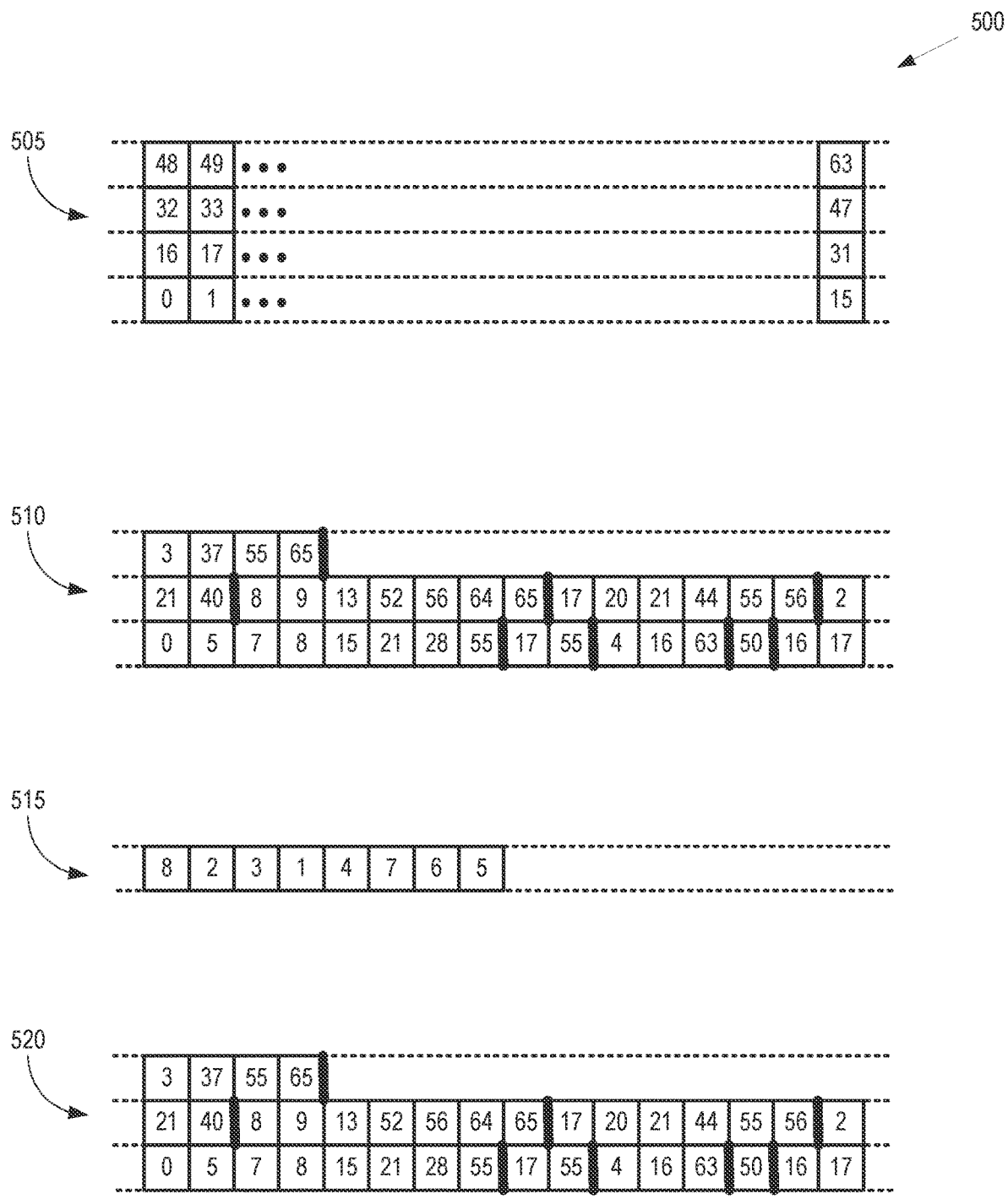
FIG. 5 is a block diagram of a portion of a memory that stores values of a sparse matrix in a compressed format according to some embodiments.

FIG. 5 is a block diagram of a portion 500 of a memory that stores values of a sparse matrix in a compressed format according to some embodiments. The portion 500 represents a portion of some embodiments of the memory 105 shown in FIG. 1 and the system memory 265 shown in FIG. 2.

In the illustrated embodiment, the portion 500 of the memory stores values of a dense vector 505 in entries corresponding to the indices [0..63]. The values are stored in four lines of the memory corresponding to the indices [0..15], [16..31], [32..47], [48..63]. Although the indices are shown in the boxes that represent the dense vector 505, the portion 500 of the memory stores the values of the entries of the dense vector 505 indicated by the indices and not the values of the indices themselves. The portion 500 also stores a vector 510 of fetch indices that are linear in the memory view. In the illustrated embodiment, the vector 510 includes the column indices of the nonzero values of the sparse matrix for each row, beginning at the bottom left and increasing to the right and upwards. The divisions between the rows of the sparse matrix are indicated by the bold vertical lines in the vector 510.

A row length vector 515 includes entries that indicate the number of nonzero values in each row of the sparse matrix. For example, the row length vector 515 indicates that the first row of the sparse matrix includes eight nonzero entries, the second row includes two nonzero entries, the third row includes three nonzero entries, etc. The portion 500 also includes the compressed sparse matrix 520 that is stored in a linear format in the memory. The numbers in the boxes of the compressed sparse matrix 520 include the indices of the columns that include the nonzero entries for each row of the sparse matrix. For example, the number in the first box (bottom left) is 0 to indicate that the first column in the first row includes a nonzero entry. The number in the second box is 5 to indicate that the fifth column in the first row includes a nonzero entry. The divisions between the rows of the sparse matrix are indicated by the bold vertical lines in the sparse matrix 520. The entries in the registers include the values of entries in the sparse matrix 520 corresponding to the row/column indicated by the indices in the boxes shown in FIG. 5 and do not include the values of the indices themselves.

Figure 6:
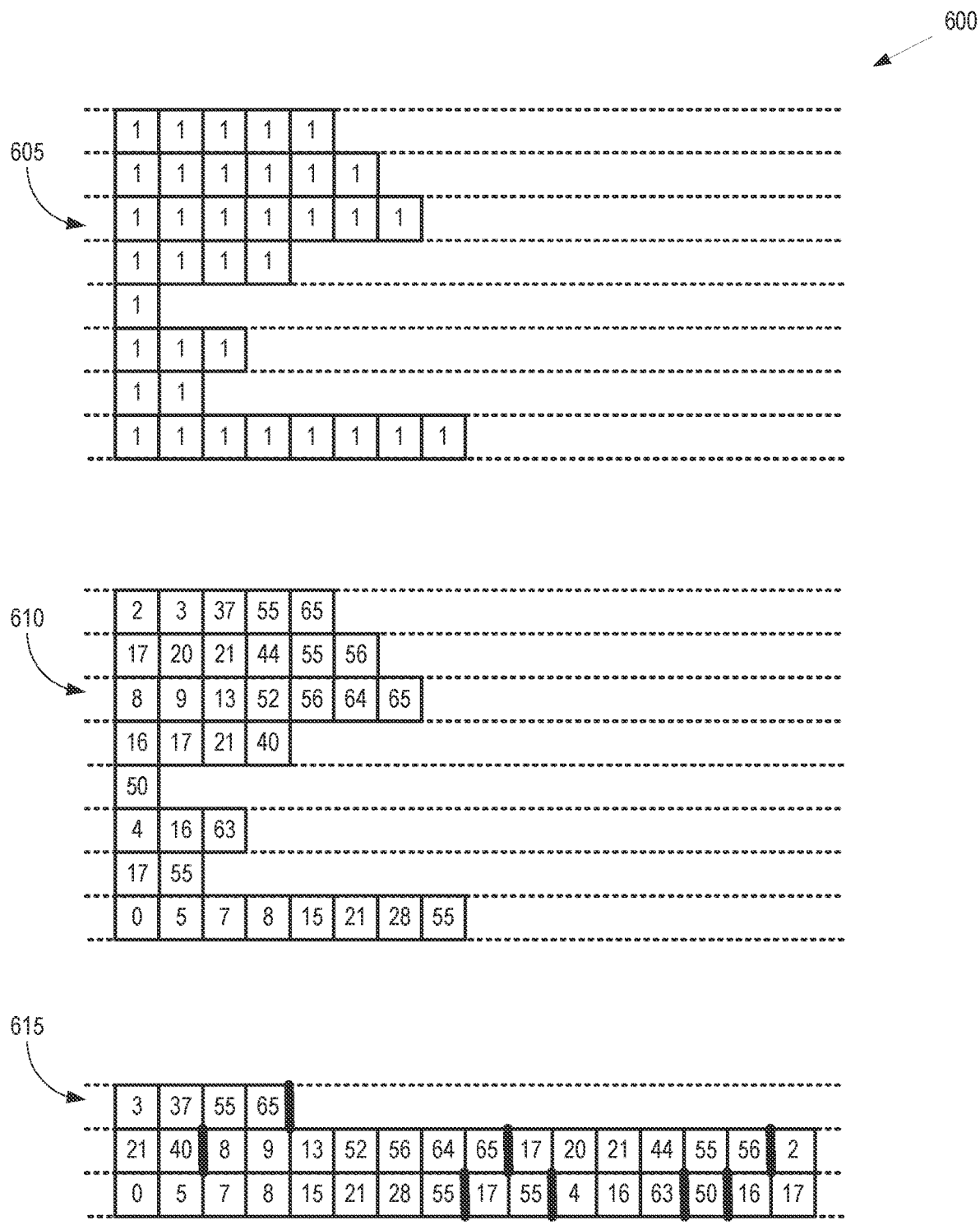
FIG. 6 is a block diagram of a first portion of a set of registers that stores values of a sparse matrix in a compressed format and a vector for a conventional matrix-vector multiplication.

FIG. 6 is a block diagram of a first portion 600 of a set of registers that stores values of a sparse matrix in a compressed format and a vector for a conventional matrix-vector multiplication. Each register in the set of registers corresponds to one line in FIG. 6. The first portion 600 includes a mask vector 605 that is used to extract sparse vectors and fetch the sparse matrix for the matrix-vector multiplication. Entries (or slots) in the registers that store the mask vector 605 are set to a value of 1 at the locations corresponding to entries (or slots) in the registers that store the nonzero values of the sparse matrix. Other entries (or slots) in the registers that store the mask 605 are set to a value of 0 to indicate that the corresponding entries (or slots) in the registers that store the sparse matrix do not include nonzero values.

A sparse vector 610 is generated based on the nonzero values in the sparse matrix. In the illustrated embodiment, each register in the sparse vector 610 corresponds to a row in the sparse matrix and each entry (or slots) in the register includes a nonzero value of the sparse matrix at a column indicated by the numeral in the box that represents the entry or slot. For example, the first entry (bottom left) of the sparse vector 610 stores a value of the vector at the position indicated by the index 0, which corresponds to the nonzero value of the sparse matrix at the location indicated by the row index 0 and the column index 0. For another example, the second entry of the sparse vector 610 stores a value of the vector at the location indicated by the index 5, which corresponds to the nonzero value of the sparse matrix at the location indicated by the row index 0 and the column index 5.

An index vector 615 is a list of the column indices of the nonzero values in the sparse matrix in row order. For example, the first entry (bottom left) of the index vector 615 includes the value 0, which indicates that the sparse matrix includes a nonzero value at the location indicated by the row index 0 and the column index 0. For another example, the second entry of the index vector 615 includes the value 5, which indicates that the sparse matrix includes a nonzero value at the location indicated by the row index 0 and the column index 5.

Figure 7:
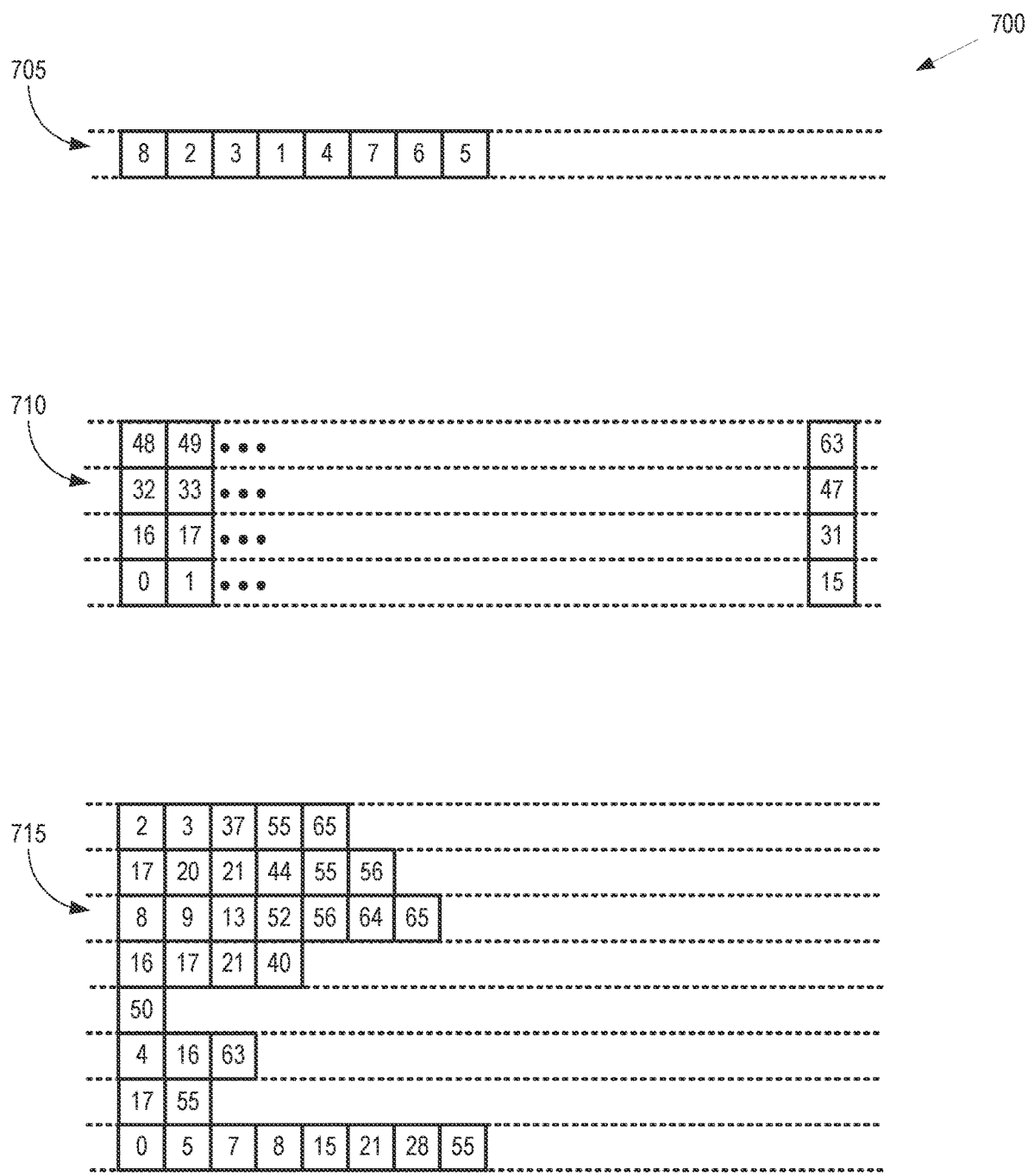
FIG. 7 is a block diagram of a second portion of the set of registers that stores values of the sparse matrix in the compressed format and the vector for the conventional matrix-vector multiplication.

FIG. 7 is a block diagram of a second portion 700 of the set of registers that stores values of the sparse matrix in the compressed format and the vector for the conventional matrix-vector multiplication. A row length vector 705 includes entries that indicate the number of nonzero values in each row of the sparse matrix. For example, the row length vector 705 indicates that the first row of the sparse matrix includes eight nonzero entries, the second row includes two nonzero entries, the third row includes three nonzero entries, etc.

The second portion 700 includes a dense vector 710 including entries corresponding to the indices [0..63]. The values are stored in four registers corresponding to the indices [0..15], [16..31], [32..47], [48..63]. Nonzero values of a sparse matrix 715 are stored in registers of the second portion 700. Each row of the sparse matrix 715 is stored in a different register in the second portion 700. For example, nonzero values of the sparse matrix 715 at locations in the row 0 indicated by the column indices 0, 5, 7, 8, 15, 21, 28, and 55 are stored in a first (bottom) register of the second portion 700. The remaining entries (or slots) of the first register are empty. For another example, nonzero values of the sparse matrix 715 at locations in the row 1 indicated by the column indices 17 and 55 are stored in a second register of the second portion 700. The remaining entries (or slots) of the second register are empty. Thus, a relatively large number of registers including a relatively large number of empty slots are used to store the nonzero values of the sparse matrix 715.

Figure 8:
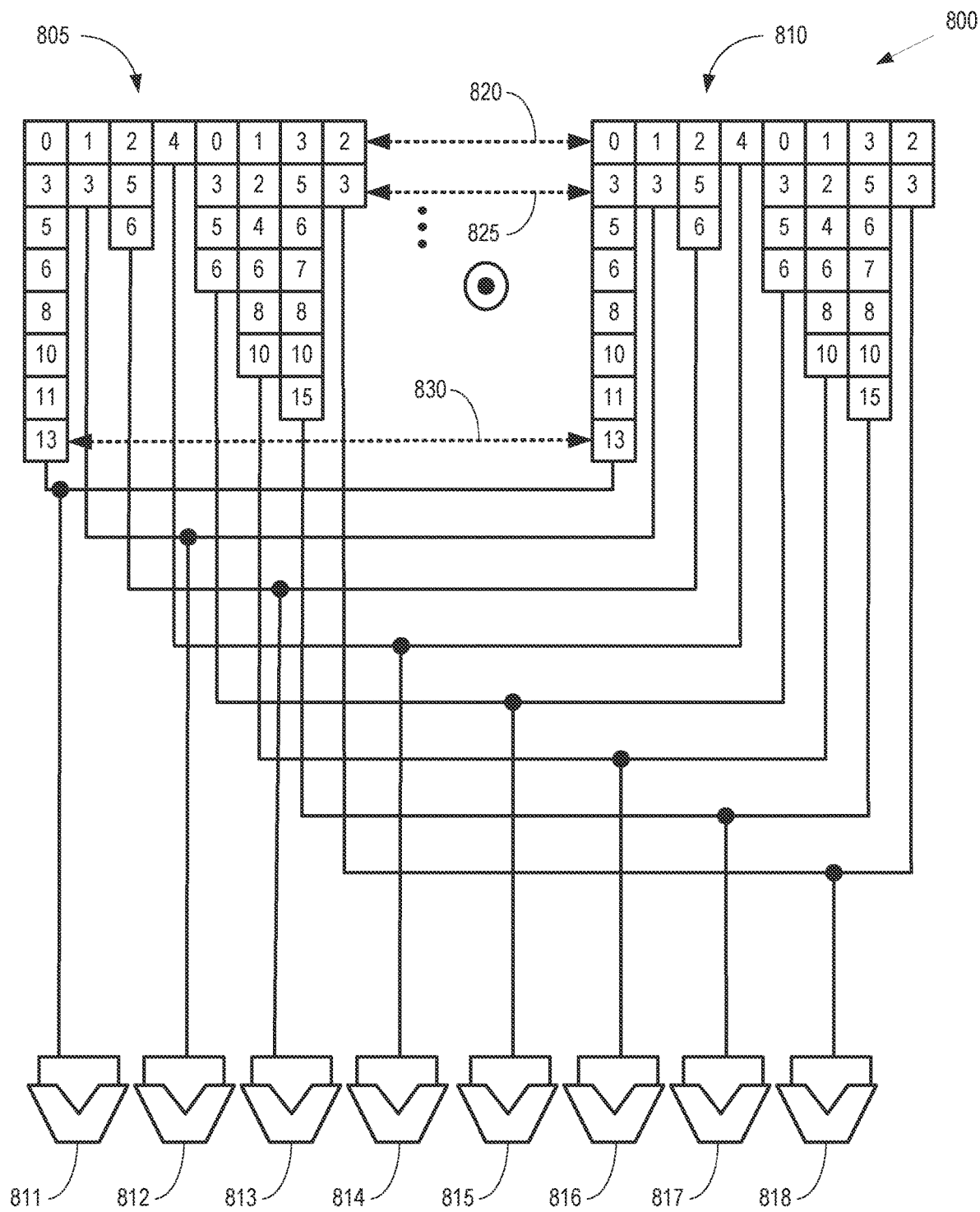
FIG. 8 is a block diagram of a conventional matrix-vector multiplication of a compressed sparse matrix and a dense vector.

FIG. 8 is a block diagram of a conventional matrix-vector multiplication 800 of a compressed sparse matrix and a dense vector. The conventional matrix-vector multiplication 800 is performed on a compressed representation of a sparse matrix 805 and a corresponding expanded matrix 810 that is formed based on values in the dense vector and the values stored in the compressed representation of the sparse matrix 805, as discussed herein.

In each clock cycle, values in corresponding locations in the sparse matrix 805 and the expanded matrix 810 are multiplied together and provided to corresponding accumulators 811, 812, 813, 814, 815, 816, 817, 818, which are collectively referred to herein as "the accumulators 811-818." For example, in a first clock cycle 820, entries in the sparse matrix 805 that represent the first non-zero value in the rows of the sparse matrix are multiplied with corresponding values in the expanded matrix 810 and the resulting products are provided to the corresponding accumulators 811-818. For another example, in a second clock cycle 825, entries in the sparse matrix 805 that represent the second nonzero value in the rows of the sparse matrix are multiplied with the corresponding values in the expanded matrix 810 and the resulting products are provided to the corresponding accumulators 811-818, which combine the results from the second clock cycle 825 with the results from the first clock cycle 820. The process continues until the matrix-vector multiplication 800 reaches the last clock cycle 830 and any nonzero values remaining in the rows of the sparse matrix 805 are multiplied with the corresponding values of the expanded matrix 810 and the resulting products are provided to the corresponding accumulators 811-818.

The latency associated with the accumulators 811-818 is therefore different for different rows of the sparse matrix 805. For example, the latency for the accumulator 811 is eight clock cycles and the latency for the accumulator 812 is two clock cycles. The total latency for the conventional matrix-vector multiplication is therefore determined by the longest latency associated with one of the accumulators 811-818, which is eight clock cycles in the illustrated embodiment. In some embodiments, an additional four clock cycles are required to flush the current instruction.

Figure 9:
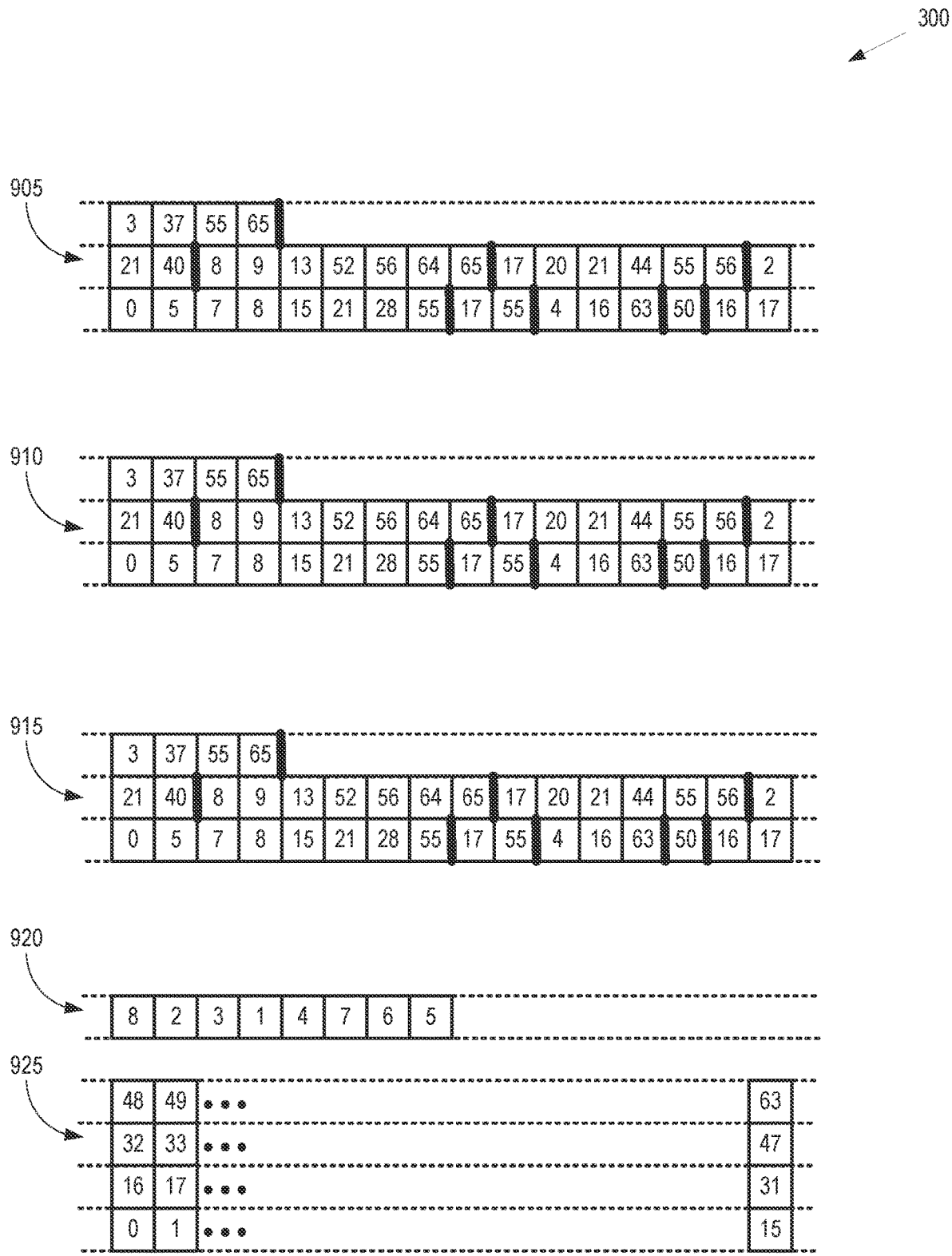
FIG. 9 is a block diagram of a portion of a set of registers that stores values of a sparse matrix in a compressed format and a vector for a sparse matrix-vector multiplication according to some embodiments.

FIG. 9 is a block diagram of a portion 900 of a set of registers that stores values of a sparse matrix in a compressed format and a vector for a sparse matrix-vector multiplication according to some embodiments. Each register in the set of registers corresponds to one line in FIG. 9. Although the indices associated with the entries (or slots) in the registers are shown in the boxes in FIG. 9, in actual implementation the entries (or slots) in the registers typically store the values of the entry at the location in the matrix or vector indicated by the index.

The portion 900 includes the compressed sparse matrix represented as a sparse vector 905 that is stored in a linear format in the set of registers. The numbers in the boxes of the sparse vector 905 include the indices of the columns that include the nonzero entries for each row of the sparse matrix. For example, the number in the first box (bottom left) is 0 to indicate that the first column in the first row includes a nonzero entry. The number in the second box is 5 to indicate that the fifth column in the first row includes a nonzero entry. The divisions between the rows of the sparse matrix are indicated by the bold vertical lines in the sparse vector 905. The entries in the sparse vector 905 store values of the entries in the sparse matrix corresponding to the indices shown in the boxes in FIG. 9. Thus, the registers that store the sparse vector 905 are packed with nonzero values from the sparse matrix such that consecutive slots in the registers are not left empty while there are additional nonzero values of the sparse matrix remaining to be fetched and stored in the portion 900 of the set of registers.

The portion 900 also includes the expanded matrix (generated based on the sparse matrix and the dense vector) represented as a sparse vector 910 that is stored in a linear format in the set of registers. The numbers in the boxes of the sparse vector 910 include the indices of the columns that include the nonzero entries for each row of the sparse matrix, which correspond to the indices of the entries in the dense vector that are multiplied by the corresponding nonzero entries in the rows of the sparse matrix. For example, the number in the first box (bottom left) is 0 to indicate the first entry in the dense vector, which is multiplied by the entry in the first row and the first column of the sparse matrix. The number in the second box is 5 to indicate the fifth entry in the dense vector, which is multiplied by the entry in the first row and the fifth column of the sparse matrix. The divisions between the rows of the expanded matrix (which correspond to the rows of the sparse matrix) are indicated by the bold vertical lines in the sparse vector 910. Thus, the registers that store the sparse vector 910 are packed with values from entries in the expanded matrix such that consecutive slots in the registers are not left empty.

An index vector 915 is a list of the column indices of the nonzero values in the sparse matrix in row order. For example, the first entry (bottom left) of the index vector 915 includes the value 0, which indicates that the sparse matrix includes a nonzero value at the location indicated by the row index 0 and the column index 0. For another example, the second entry of the index vector 915 include the value 5, which indicates that the sparse matrix includes a nonzero value at the location indicated by the row index 0 and the column index 5.

A row length vector 920 includes entries that indicate the number of nonzero values in each row of the sparse matrix. For example, the row length vector 920 indicates that the first row of the sparse matrix includes eight nonzero entries, the second row includes two nonzero entries, the third row includes three nonzero entries, etc.

Values of a dense vector 925 in entries corresponding to the indices [0..63]. The values are stored in four lines corresponding to the indices [0..15], [16..31, [32..47], [48..63].

Figure 10:
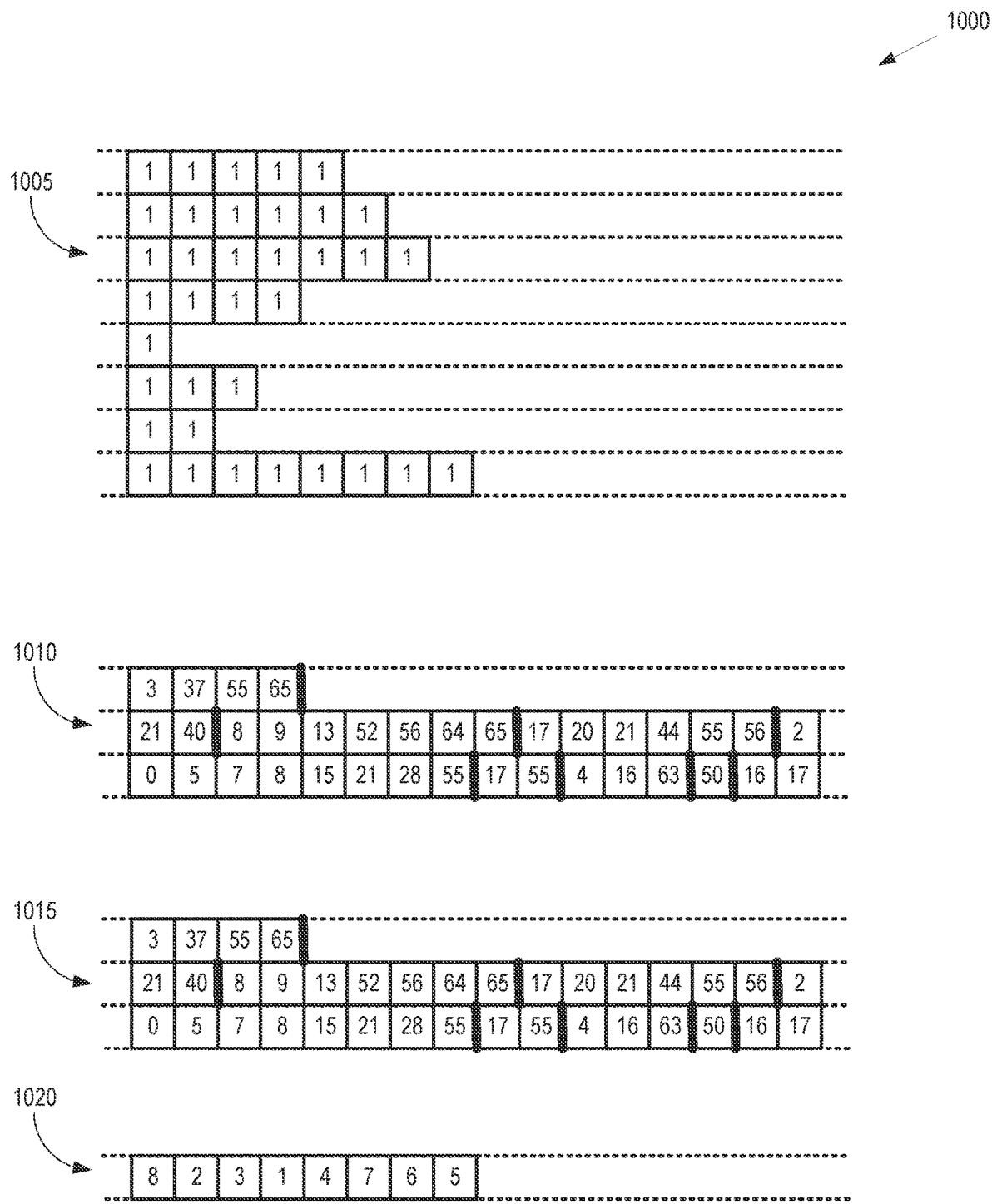
FIG. 10 is a block diagram of a portion of a set of registers that stores results of a sparse matrix-vector multiplication in a compressed format in a shared memory according to some embodiments.

FIG. 10 is a block diagram of a portion 1000 of a set of registers that stores results of a sparse matrix-vector multiplication in a compressed format in a shared memory according to some embodiments. Each register in the set of registers corresponds to one line in FIG. 10. In some embodiments, the shared memory is a shared load data store (LDS) memory. The matrix resulting from the sparse matrix-vector multiplication is referred to herein as the sparse results matrix. Although the indices associated with the entries (or slots) in the registers are shown in the boxes in FIG. 10, the entries (or slots) in the registers store the values of the entry at the location in the sparse results matrix indicated by the index.

The first portion 1000 includes a mask vector 1005 that is used to extract sparse vectors and fetch the sparse results matrix for subsequent operations such as a subsequent sparse matrix-vector multiplication. Entries (or slots) in the registers that store the mask vector 1005 are set to a value of 1 at the locations corresponding to entries (or slots) in the registers that store the nonzero values of the sparse results matrix. Other entries (or slots) in the registers that store the mask vector 1005 are set to a value of 0 to indicate that the corresponding entries (or slots) in the registers that store the sparse results matrix do not include nonzero values.

The portion 1000 includes the sparse results matrix represented as a result vector 1010 that is stored in a linear format in the set of registers. The numbers in the boxes of the results vector 1010 include the indices of the columns that include the nonzero entries for each row of the sparse results matrix. For example, the number in the first box (bottom left) is 0 to indicate that the first column in the first row includes a nonzero entry. The number in the second box is 5 to indicate that the fifth column in the first row includes a nonzero entry. The divisions between the rows of the sparse results matrix are indicated by the bold vertical lines in the results vector 1010. Thus, the registers that store the results vector 1010 are packed with nonzero values from the sparse results matrix such that consecutive slots in the registers are not left empty.

An index vector 1015 is a list of the column indices of the nonzero values in the sparse results matrix in row order. For example, the first entry (bottom left) of the index vector 1015 includes the value 0, which indicates that the sparse results matrix includes a nonzero value at the location indicated by the row index 0 and the column index 0. For another example, the second entry of the index vector 1015 include the value 5, which indicates that the sparse results matrix includes a nonzero value at the location indicated by the row index 0 and the column index 5.

A row length vector 1020 includes entries that indicate the number of nonzero values in each row of the sparse results matrix. For example, the row length vector 1020 indicates that the first row of the sparse results matrix includes eight nonzero entries, the second row includes two nonzero entries, the third row includes three nonzero entries, etc.

Figure 11:
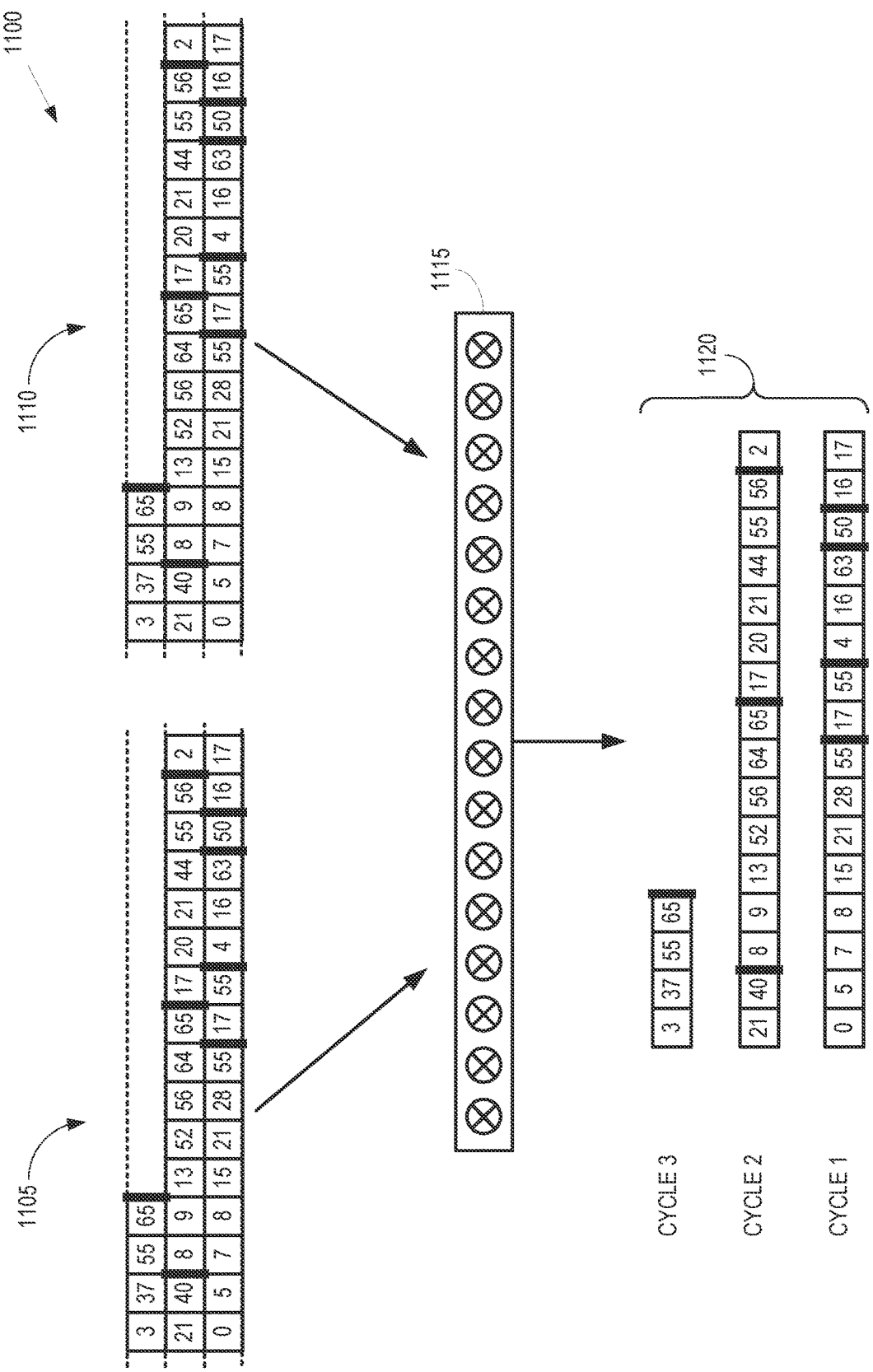
FIG. 11 is a block diagram of a sparse matrix-vector multiplication performed using concurrent multiplication of entries in packed registers according to some embodiments.

FIG. 11 is a block diagram of a sparse matrix-vector multiplication 1100 performed using concurrent multiplication of entries in packed registers according to some embodiments. The sparse matrix-vector multiplication 1100 is performed in some embodiments of the processing system 100 shown in FIG. 1, the processing system 200 shown in FIG. 2, and the array processor 300 shown in FIG. 3.

The sparse matrix-vector multiplication 1100 is performed on a sparse vector 1105 that represents a compressed sparse matrix (e.g., the sparse vector 905 shown in FIG. 9) and a sparse vector 1110 that represents an expanded matrix generated from a dense vector and the compressed sparse matrix (e.g., the source vector 910 shown in FIG. 9).

The sparse matrix-vector multiplication 1100 is performed by an array 1115 of multipliers. In some embodiments, the array 1115 of multipliers is implemented in one or more arithmetic logic units (ALUs). The number of multipliers in the array 1115 is set equal to the number of entries in each register of the set of registers that are used to represent the sparse vector 1105 and the sparse vector 1110. The multipliers in the array 1115 concurrently multiply values of entries in one of the registers in the sparse vectors 1105, 1110 during each clock cycle. For example, in a first clock cycle, a first multiplier in the array 1115 multiplies values in the entries indicated by the index "0" in the first registers of the sparse vectors 1105, 1110, a second multiplier in the array 1115 multiplies values in the entries indicated by the index "5" in the first registers of the sparse vectors 1105, 1110, etc.

The results of the multiplications are provided to registers in a sparse results vector 1120. In the illustrated embodiment, the array 1115 provides results from multiplication of the values in the entries of the first registers of the sparse vectors 1105, 1110 to a first register in the sparse results vector 1120 during a first cycle. The array 1115 provides results from multiplication of the values in the entries of the second registers of the sparse vectors 1105, 1110 to a second register in the sparse results vector 1120 during a second cycle. The array 1115 provides results from multiplication of the values in the entries of the third registers of the sparse vectors 1105, 1110 to a third register in the sparse results vector 1120 during a third cycle. The first and second registers in the sparse vectors 1105, 1110 and the sparse results vector 1120 are fully packed with values and the third registers in the sparse vectors 1105, 1110 and the sparse results vector 1120 include results corresponding to the remaining nonzero entries in the sparse matrix represented by the sparse vector 1105.

Figure 12:
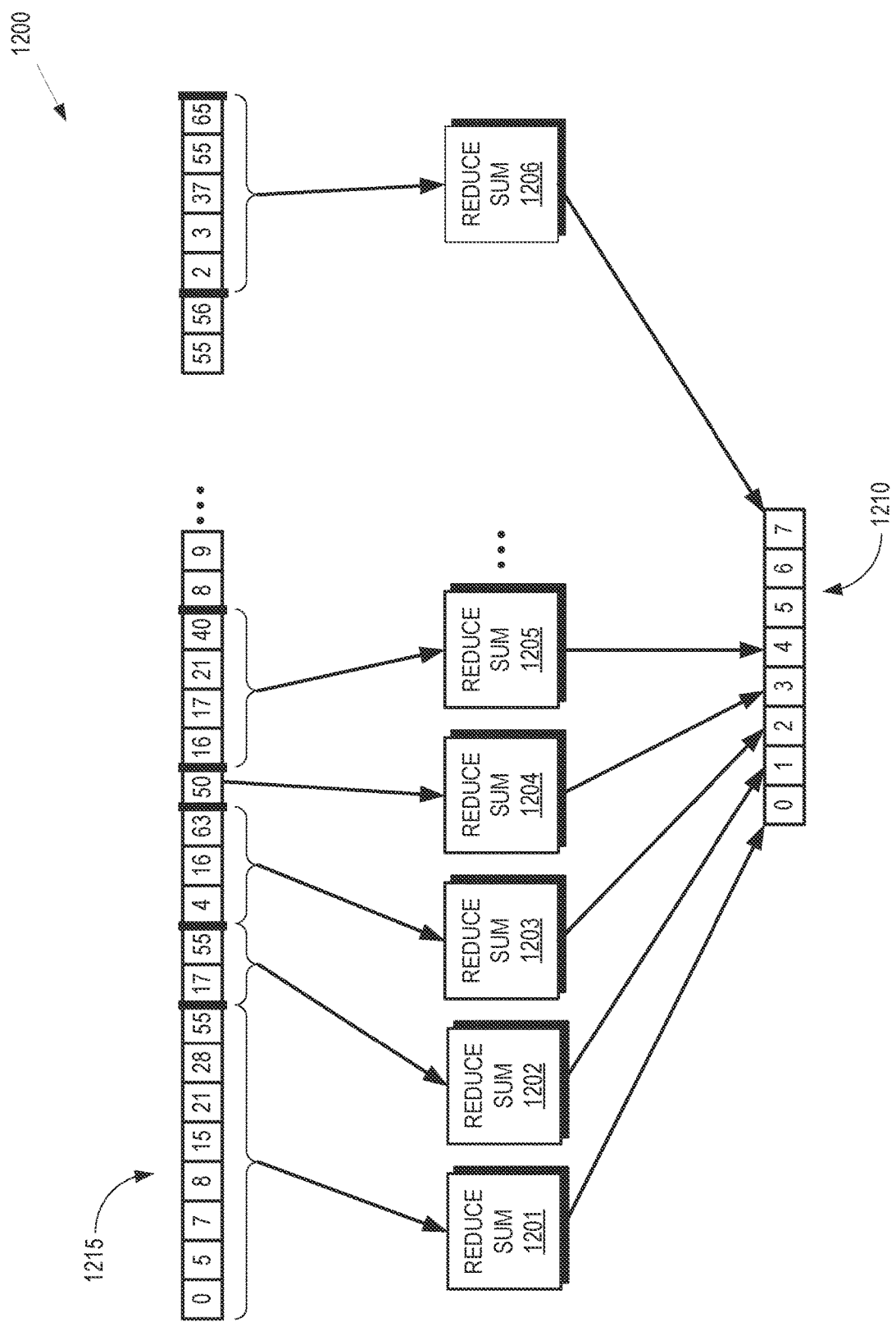
FIG. 12 is a block diagram of a reduced sum operation that gathers results concurrent multiplications of register entries to produce a final result of sparse matrix-vector multiplication according to some embodiments.

FIG. 12 is a block diagram of a reduced sum operation 1200 that gathers results concurrent multiplications of register entries to produce a final result of sparse matrix-vector multiplication according to some embodiments. The reduced sum operation 1200 is performed in some embodiments of the processing system 100 shown in FIG. 1, the processing system 200 shown in FIG. 2, and the array processor 300 shown in FIG. 3.

Reduced sum circuitry 1201, 1202, 1203, 1204, 1205, 1206 (collectively referred to herein as "the reduced sum circuitry 1201-1206") gathers the results of a sparse matrix-vector multiplication such as the sparse matrix-vector multiplication 1100 shown in FIG. 11. The reduced sum circuitry 1201-1206 is implemented as a set of independent circuits or as circuitry that is time-shared or time-multiplexed. The results are gathered based on characteristics of the sparse matrix. In the illustrated embodiment, the reduced sum circuitry 1201-1206 gathers the results of multiplications performed for each row of the sparse matrix to generate an output value for a corresponding entry in an output vector 1210. For example, the reduced sum circuitry 1201 gathers the results of the multiplications performed for a first row of the sparse matrix, which includes the products of the values in the entries of the first row and the columns (0, 5, 7, 8, 15, 21, 28, 55) of the sparse matrix with corresponding entries in the dense vector, as discussed herein. If the reduced sum circuitry 1201-1206 operates on a time-shared basis, each entry in the output vector 1210 is generated in a different cycle.

The gathered results are accumulated and provided to the corresponding entry in the output vector 1210, e.g., the entry indicated by the index "0" is provided by the reduced sum circuitry 1201. The output vector 1210 is stored in a shared memory such as a shared LDS memory.

Some embodiments of the devices and techniques disclosed herein have advantages over conventional practice. For example, the utilization efficiency of SIMD multipliers is improved. Furthermore, storage space in registers such as GPR says reduced by packing both the sparse matrices and the uncompressed sparse vectors in a packed format in the registers and then performing multiplications based on the compressed formats. The number of cycles used to compute multiplications is fixed in some embodiments, instead of being dependent on the structure of the sparse matrix. The number of cycles needed to derive the final result using the reduced sum operation depends on the number of arithmetic operators used to perform the gathering and accumulation operations.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   a first set of general-purpose registers (GPRs) and a second set of GPRs;
   memory access circuitry configured to fetch nonzero values of a sparse matrix into consecutive slots in the first set and fetch values of an expanded matrix into consecutive slots in the second set, wherein the expanded matrix is formed based on values of a vector and locations of the nonzero values in the sparse matrix;
   a set of multipliers configured to concurrently perform multiplication of the nonzero values in slots of the first set of GPRs with the values of the vector in corresponding slots of the second set; and reduced sum circuitry configured to accumulate results from the set of multipliers for rows of the sparse matrix.

2. The apparatus of claim 1, wherein the memory access circuitry is configured to fetch nonzero values of the sparse matrix into all slots of one GPR in the first set before fetching subsequent nonzero values into another GPR in the first set.

3. The apparatus of claim 2, wherein the memory access circuitry is configured to pack the GPRs with nonzero values from the sparse matrix such that consecutive slots in the first set of GPR are not left empty while there are additional nonzero values of the sparse matrix remaining to be fetched.

4. The apparatus of claim 2, wherein the memory access circuitry is configured to fetch values of the expanded matrix into all slots of one GPR in the second set before fetching subsequent values of the expanded matrix into another GPR in the second set.

5. The apparatus of claim 1, wherein the set of multipliers is configured to concurrently perform multiplication of the nonzero values in the slots of the first set of GPRs that are associated with different rows or columns of the sparse matrix.

6. The apparatus of claim 5, further comprising:
a load data store (LDS) shared memory, wherein the set of multipliers store products of the nonzero values of the sparse matrix and the values of the vector.

7. The apparatus of claim 6, wherein the reduced sum circuitry is configured to gather the products from the LDS shared memory and accumulate values the products for the rows of the sparse matrix.

8. The apparatus of claim 1, wherein the nonzero values of the sparse matrix are stored in a compressed format that represents the sparse matrix as a first array of entries that indicate the nonzero values of the sparse matrix, a second array of entries that indicate column indices of the nonzero values in the sparse matrix, and a third array of entries that indicate numbers of nonzero values in rows of the sparse matrix.

9. A method comprising:
fetching nonzero values of a sparse matrix into consecutive slots in a first set of general-purpose registers (GPRs);
fetching values of an expanded matrix into consecutive slots in a second set of GPRs, wherein the expanded matrix is formed based on values of a vector and locations of the nonzero values in the sparse matrix;
concurrently multiplying the nonzero values in slots of the first set of GPRs with the values of the vector in corresponding slots of the second set; and
accumulating results from the multiplications for rows of the sparse matrix.

10. The method of claim 9, wherein fetching the nonzero values of the sparse matrix comprises fetching the nonzero values of the sparse matrix into all slots of one GPR in the first set before fetching subsequent nonzero values into another GPR in the first set.

11. The method of claim 10, wherein fetching the nonzero values of the sparse matrix comprises packing the GPRs with nonzero values from the sparse matrix such that consecutive slots in the first set of GPR are not left empty while there are additional nonzero values of the sparse matrix remaining to be fetched.

12. The method of claim 10, wherein fetching the values of the expanded matrix comprises fetching the values of the expanded matrix into all slots of one GPR in the second set before fetching subsequent values of the expanded matrix into another GPR in the second set.

13. The method of claim 9, wherein concurrently multiplying the nonzero values of the sparse matrix with the values of the vector comprises concurrently multiplying the nonzero values in the slots of the first set of GPRs that are associated with different rows or columns of the sparse matrix.

14. The method of claim 13, further comprising:
storing products of the nonzero values of the sparse matrix and the values of the vector in a local data store (LDS) shared memory.

15. The method of claim 14, further comprising:
gathering the products from the LDS shared memory; and
accumulating values the products for the rows of the sparse matrix.

16. The method of claim 9, further comprising:
storing the nonzero values of the sparse matrix in a compressed format that represents the sparse matrix as a first array of entries that indicate the nonzero values of the sparse matrix, a second array of entries that indicate column indices of the nonzero values in the sparse matrix, and a third array of entries that indicate numbers of nonzero values in rows of the sparse matrix.

17. An apparatus comprising:
a first set of general-purpose registers (GPRs) configured to store nonzero values of a sparse matrix in consecutive slots of the first set such that a GPR in the first set stores nonzero values from multiple rows and columns of the sparse matrix;
a second set of GPRs configured to store values of an expanded matrix in consecutive slots in the second set, wherein the expanded matrix is formed based on values of a vector and locations of the nonzero values in the sparse matrix;
a set of multipliers configured to concurrently perform multiplication of the nonzero values from multiple rows and columns of the sparse matrix with corresponding values of the vector in the expanded matrix; and
reduced sum circuitry configured to accumulate results from the set of multipliers for rows of the sparse matrix.

18. The apparatus of claim 17, further comprising:
memory access circuitry configured to fetch the nonzero values of the sparse matrix into consecutive slots in the first set and fetch values of the expanded matrix into consecutive slots in the second set.

19. The apparatus of claim 17, further comprising:
a load data store (LDS) shared memory, wherein the set of multipliers store products of the nonzero values of the sparse matrix and the values of the vector, and wherein the reduced sum circuitry is configured to gather the products from the LDS shared memory and accumulate values the products for the rows of the sparse matrix.

20. The apparatus of claim 17, wherein the nonzero values of the sparse matrix are stored in a compressed format that represents the sparse matrix as a first array of entries that indicate the nonzero values of the sparse matrix, a second array of entries that indicate column indices of the nonzero values in the sparse matrix, and a third array of entries that indicate numbers of nonzero values in rows of the sparse matrix.

* * * * *